United States Patent
Lee et al.

(10) Patent No.: US 11,309,742 B2
(45) Date of Patent: Apr. 19, 2022

(54) WIRELESS CHARGING METHOD AND SYSTEM FOR DETECTING FOREIGN MATERIAL DURING WIRELESS CHARGING

(71) Applicant: Samsung Electronics Co., Ltd., Gyeonggi-do (KR)

(72) Inventors: Wooram Lee, Gyeonggi-do (KR); Seho Park, Gyeonggi-do (KR); Mingi Song, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/140,807

(22) Filed: Jan. 4, 2021

(65) Prior Publication Data

US 2021/0210983 A1 Jul. 8, 2021

(30) Foreign Application Priority Data

Jan. 8, 2020 (KR) .................. 10-2020-0002779

(51) Int. Cl.
*H02J 50/12* (2016.01)
*H02J 50/60* (2016.01)
*H02J 50/80* (2016.01)

(52) U.S. Cl.
CPC .............. *H02J 50/12* (2016.02); *H02J 50/60* (2016.02); *H02J 50/80* (2016.02)

(58) Field of Classification Search
CPC ...................................... H02J 50/12
USPC ........................................ 307/104
See application file for complete search history.

(56) References Cited

U.S. PATENT DOCUMENTS

| 2013/0307348 A1 | 11/2013 | Oettinger et al. |
| 2014/0266036 A1 | 9/2014 | Jung et al. |
| 2017/0063165 A1 | 3/2017 | Baarman et al. |
| 2018/0026482 A1* | 1/2018 | Asano ............ H02J 7/00 307/104 |
| 2018/0076671 A1* | 3/2018 | Chopra .......... H01F 38/14 |

(Continued)

FOREIGN PATENT DOCUMENTS

| KR | 10-2019-0050301 | 5/2019 |
| KR | 10-2019-0087033 | 7/2019 |

OTHER PUBLICATIONS

International Search Report dated Mar. 26, 2021 issued in counterpart application No. PCT/KR2020/018540, 8 pages.

*Primary Examiner* — Joseph Chang
(74) *Attorney, Agent, or Firm* — The Farrell Law Firm, P.C.

(57) ABSTRACT

Wireless charging methods and systems are provided for detecting foreign material by measuring a Q-factor based on a predefined packet and a transmission sequence while a wireless charging transmission device transmits power. An electronic device includes a battery; a coil; a wireless charging reception circuit; a power management module configured to control a charging state of the battery using a voltage supplied from the wireless charging reception circuit; and a processor configured to receive power from a wireless charging transmission device through the coil, determine whether a predetermined condition is satisfied while the battery is charged using the received power, and transmit a foreign material detection request packet to the wireless charging transmission device in response to determining that the predetermined condition is satisfied.

17 Claims, 12 Drawing Sheets

(56) References Cited

U.S. PATENT DOCUMENTS

| | | |
|---|---|---|
| 2018/0262047 A1* | 9/2018 | Files ................. H02J 50/80 |
| 2019/0222073 A1 | 7/2019 | Lee et al. |
| 2019/0296590 A1 | 9/2019 | Chae |
| 2019/0312468 A1 | 10/2019 | Kwon et al. |
| 2019/0326786 A1 | 10/2019 | Kim et al. |
| 2020/0343765 A1 | 10/2020 | Kwon et al. |

* cited by examiner

WIRELESS CHARGING METHOD AND SYSTEM FOR DETECTING FOREIGN MATERIAL DURING WIRELESS CHARGING

CROSS-REFERENCE TO RELATED APPLICATION(S)

This application is based on and claims priority under 35 U.S.C. § 119 to Korean Patent Application No. 10-2020-0002779, which was filed in the Korean Intellectual Property Office on Jan. 8, 2020, the entire disclosure of which is incorporated herein by reference.

BACKGROUND

1. Field

The disclosure relates generally to a wireless charging method and system for detecting foreign material during wireless charging and, more particularly, to a wireless charging method and system for detecting foreign material by measuring a Q-factor based on a predefined packet and a transmission sequence while a wireless charging transmission device transmits power.

2. Description of Related Art

Wireless charging technology or non-contact charging technology has been developed and applied to various electronic devices.

Wireless charging technology is used to perform charging without a physical connection between a battery of the electronic device and a wired charger. For example, wireless charging technology may charge a battery by placing a smartphone or a wearable device on a charging pad or in a charging cradle.

However, when using wireless charging technology, foreign material may exist between a wireless power transmission (Tx) device and a wireless power reception (Rx) device, reducing the efficiency of the wireless charging and possibly generating heat, which may be dangerous, e.g., by starting a fire or burning a user.

Accordingly, conventional wireless charging technology should be improved to accurately detect foreign material during wireless charging.

SUMMARY

The disclosure has been made to address at least the disadvantages described above and to provide at least the advantages described below.

An aspect of the disclosure is to provide a wireless charging method and system for accurately detecting the presence of foreign material during wireless charging.

Another aspect of the disclosure is to provide a wireless charging method and system that prevents safety hazards by accurately detecting foreign material during wireless charging.

Another aspect of the disclosure is to provide a wireless charging method and system that maintains a state in which a wireless power reception device charges a battery, even during an operation of detecting foreign material, thereby increasing a user's peace of mind and convenience.

In accordance with an aspect of the disclosure, an electronic device is provided. The electronic device includes a battery; a coil; a wireless charging reception circuit; a power management module configured to control a charging state of the battery using a voltage supplied from the wireless charging reception circuit; and a processor configured to receive power from a wireless charging transmission device through the coil, determine whether a predetermined condition is satisfied while the battery is charged using the received power, and transmit a foreign material detection request packet to the wireless charging transmission device in response to determining that the predetermined condition is satisfied.

In accordance with another aspect of the disclosure, an apparatus for performing wireless charging transmission is provided. The apparatus includes a transmission coil; wireless charging transmission circuit; and a controller configured to configure charging, based on an exchange of at least one predetermined packet with a detected wireless charging reception device, transmit power to the detected wireless charging reception device, based on the configured charging, temporarily stop transmitting power in response to receiving a foreign material detection request packet from the wireless charging reception device while the power is being transmitted, detect whether foreign material is present based on a resonance characteristic of the transmission coil while transmission of the power is temporarily stopped, completely stop transmitting the power in response to detecting that the foreign material is present, and reinitiate the transmission of the power in response to detecting that the foreign material is not present.

In accordance with another aspect of the disclosure, a method is provided for performing wireless charging by an electronic device. The method includes receiving power from a wireless charging transmission device; determining whether a predetermined condition is satisfied while a battery is charged using the received power; and transmitting a foreign material detection request packet to the wireless charging transmission device in response to determining that the predetermined condition is satisfied.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Various embodiments of the disclosure will now be described in detail with reference to the accompanying drawings. In the following description, specific details such as detailed configuration and components are merely provided to assist the overall understanding of these embodiments. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
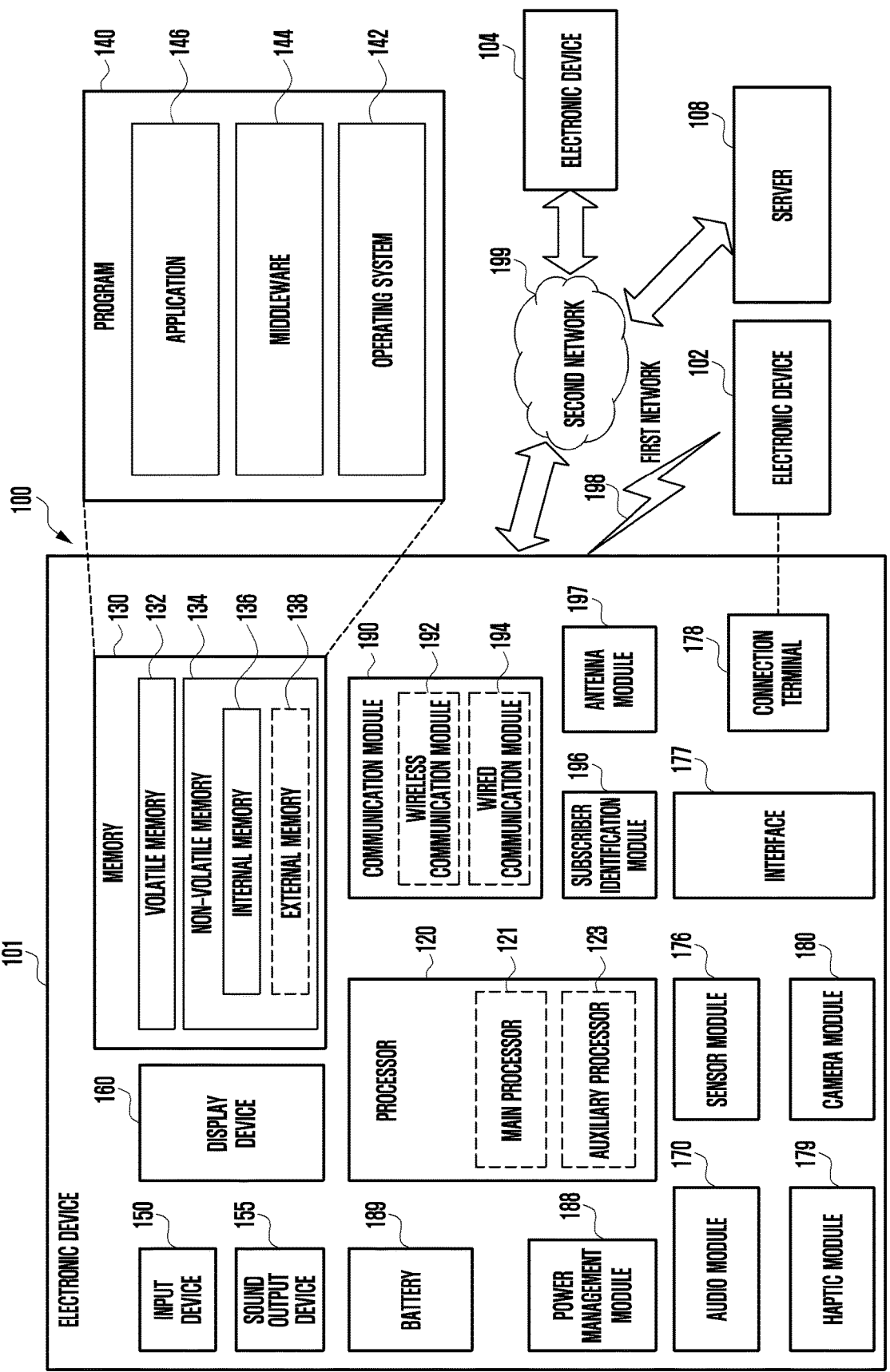
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a PMIC.

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a 5th generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional (FD)-MIMO, array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface, and capable of supporting a designated high-frequency band (e.g., the mmWave band), and a plurality of antennas (e.g., array antennas) disposed on a second surface (e.g., the top or a side surface) of the printed circuit board, or adjacent to the second surface, and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic device 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
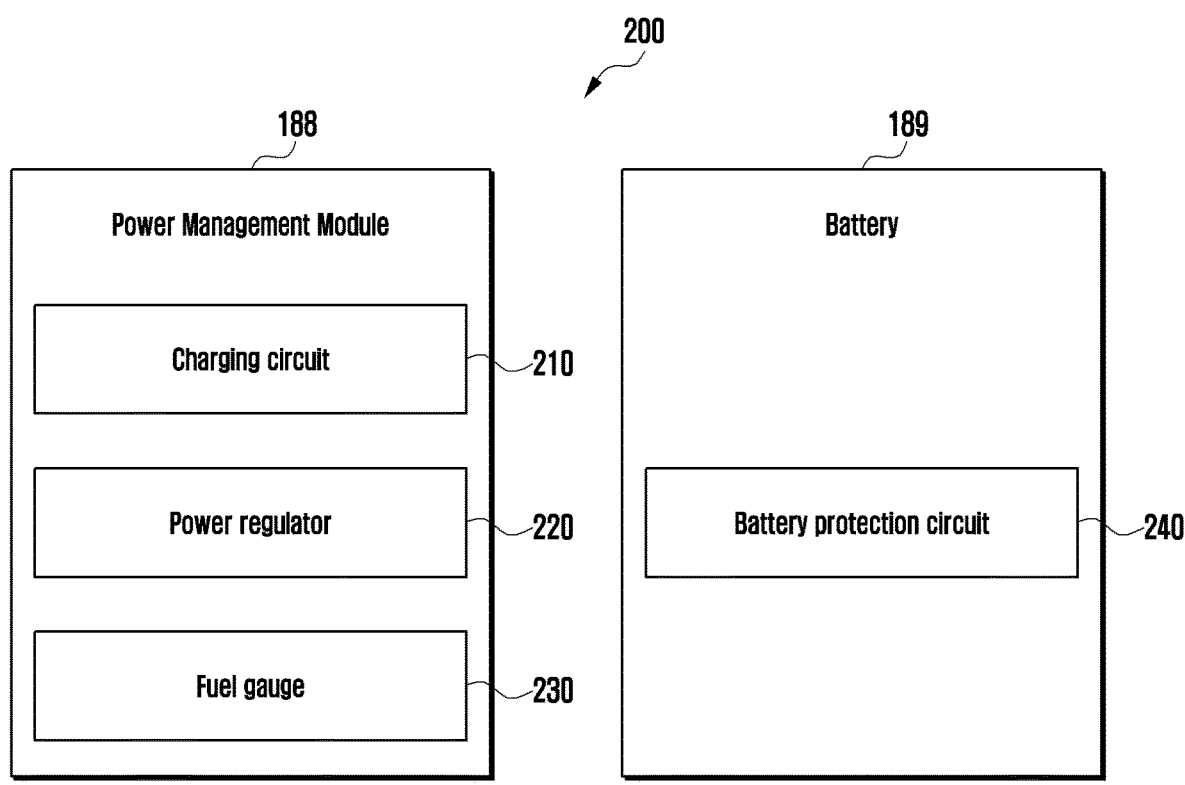
FIG. 2 illustrates a power management module and a battery according to an embodiment.

FIG. 2 a power management module and a battery according to an embodiment.

Referring to FIG. 2, the power management module (e.g., the power management module 188 of FIG. 1) may include charging circuitry 210, a power adjuster 220, or a power gauge 230. The charging circuitry 210 may charge a battery (e.g., the battery 189 of FIG. 1) by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
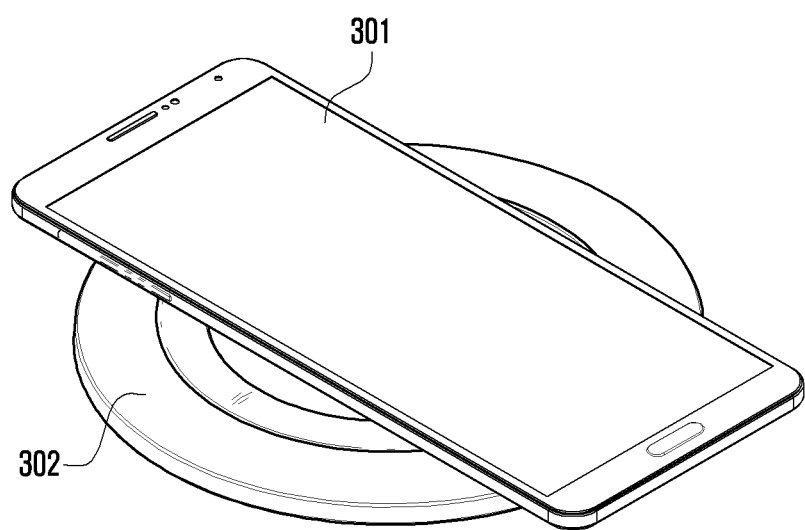
FIG. 3 illustrates a wireless charging system according to an embodiment.

FIG. 3 illustrates a wireless charging system according to an embodiment.

Referring to FIG. 3, a wireless charging system includes a Tx device 302 and an Rx device 301.

The Tx device 302 may be a charging pad for transmitting wireless power on the basis of power supplied from a charger (e.g., a travel adapter (TA)), or may be an electronic device having a wireless power transmission function.

The Rx device 301 may be an electronic device such as a smartphone or a wearable device.

Figure 4:
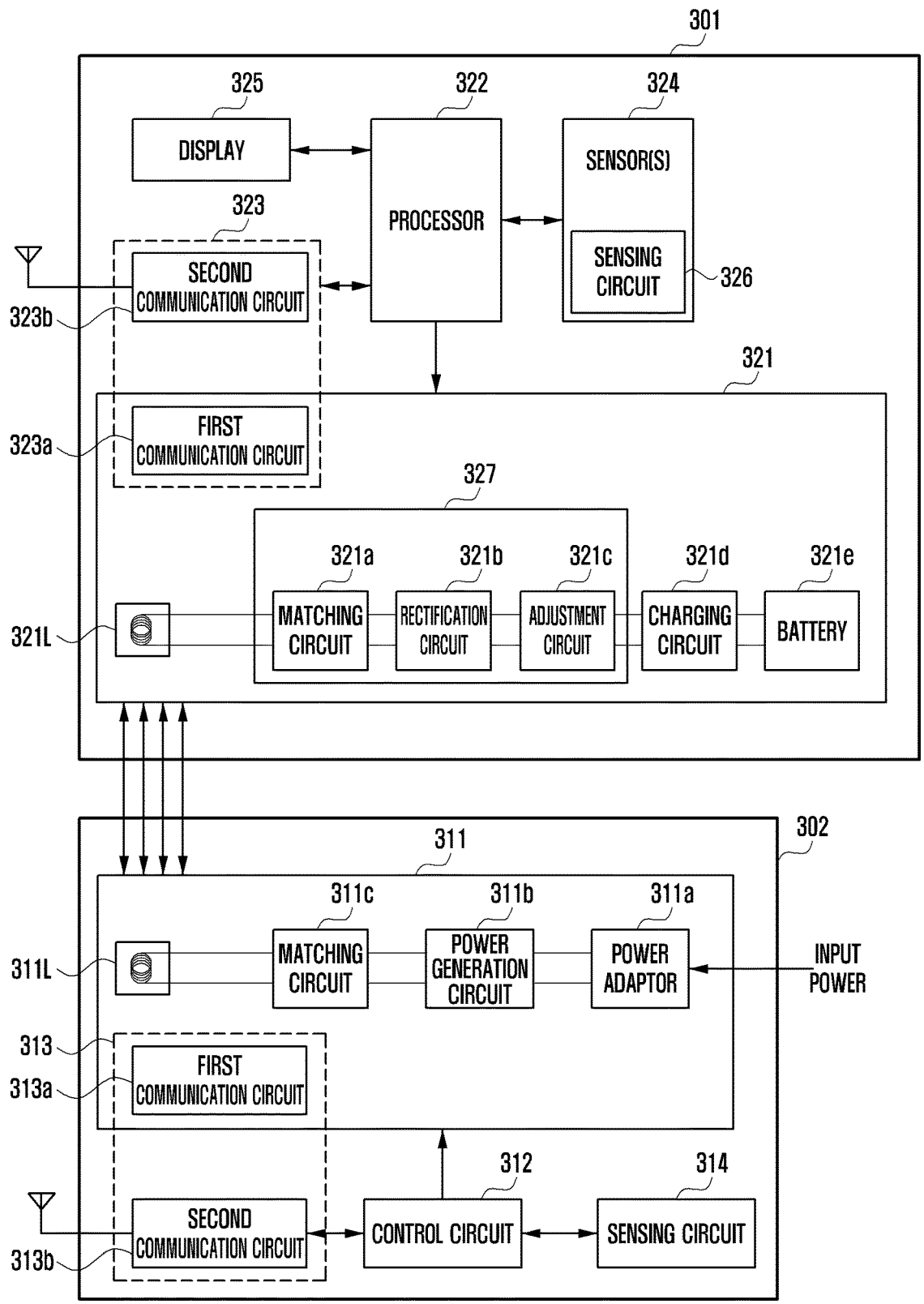
FIG. 4 illustrates a wireless charging system according to an embodiment.

FIG. 4 illustrates a wireless charging system according to an embodiment.

Referring to FIG. 4, the wireless charging system includes the Tx device 302 and the Rx device 301. When the Rx device 301 is placed on the Tx device 302, the Tx device 302 may wirelessly supply power to the Rx device 301.

The Tx device 302 includes a power transmission circuit 311, a control circuit 312, a communication circuit 313, and a sensing circuit 314.

The power transmission circuit 311 includes a power adapter 311a for receiving a power source (or power) from the outside and appropriately converting the voltage of the input power source, a power generation circuit 311b for generating power, and a matching circuit 311c for maximizing efficiency between a transmission coil 311L and a reception coil 321L.

The power transmission circuit 311 may include a plurality of power adapters 311a, power generation circuits 311b, transmission coils 311L, and/or matching circuits 311c in order to transmit power can to a plurality of Rx devices.

The control circuit 312 may perform overall control of the Tx device 302, generate various messages for wireless power transmission, and transmit the messages to the communication circuit 313. The control circuit 312 may calculate the power (or the amount of power) to be transmitted to the Rx device 301 based on information received from the communication circuit 313. The control circuit 312 may control the power transmission circuit 311 such that the power generated by the transmission coil 311L is transmitted to the Rx device 301.

The communication circuit 313 includes a first communication circuit 313a and a second communication circuit 313b. The first communication circuit 313a may communicate with a first communication circuit 323a of the Rx device 301 through a frequency that is the same as or adjacent to the frequency used for power transmission by the transmission coil 311L (e.g., in an in-band manner).

The first communication circuit 313a may communicate with the first communication circuit 323a of the Rx device 301 using the transmission coil 311L. Data (or a communication signal) generated by the first communication signal 313a may be transmitted using the transmission coil 311L. The first communication circuit 313a may transmit data to the Rx device 301 through a frequency-shift keying (FSK) modulation scheme. The first communication circuit 313a may communicate with the first communication circuit 323a of the Rx device 301 by changing the frequency of a power signal transmitted through the transmission coil 311L. Alternatively, the first communication circuit 313a may communicate with the first communication circuit 323a of the Rx device 301 by inserting data into a power signal generated by the power generation circuit 311b. For example, the first communication circuit 313a may express data by increasing or decreasing the frequency of a power transmission signal.

The second communication circuit 313b may communicate with a second communication circuit 323b of the Rx device 301 through a frequency that is different from the frequency used for power transmission by the transmission coil 311L (e.g., in an out-band manner). The second communication circuit 313b may acquire information related to a charging state (e.g., a voltage value after a rectifier, rectified voltage value (Vrect) information, or information on a current flowing in a coil 321L or a rectification circuit 321b (Iout), various packets, and/or messages) from the second communication circuit 323b through various short-range communication schemes such as Bluetooth, Bluetooth low energy (BLE), Wi-Fi, and near field communication (NFC).

The sensing circuit 314 may include one or more sensors, and at least one state of the power transmission device 301 may be detected using one or more sensors.

The sensing circuit 314 may include at least one of a temperature sensor, a motion sensor, or a current (or voltage) sensor, detect the temperature of the Tx device 302 through the temperature sensor, detect a state of motion of the Tx device 302 through the motion sensor, and detect the state of an output signal of the Tx device 302, e.g., a current size, a voltage size, or a power size, through the current (or voltage) sensor.

The current (or voltage) sensor may measure a signal in the power transmission circuit 311. The current (or voltage) sensor may measure a signal in at least some areas of the matching circuit 311c or the power generation circuit 311b. The current (or voltage) sensor may include a circuit for measuring a signal at a front end of the coil 311L.

The sensing circuit 314 may detect foreign material (.g., perform foreign object detection (FOD)).

The Rx device 301 includes a power reception circuit 321, a processor 322, a communication circuit 323, at least one sensor 324, a display 325, and a sensing circuit 326. A description of the elements of the Rx device 301 corresponding to those of the Tx device 302 is omitted.

The power reception circuit 321 includes a reception coil 321L for wirelessly receiving power from the Tx device 302, an Rx IC 327, a charging circuit 321d (e.g., a PMIC, a switched capacitor, or a voltage divider), and a battery 321e. The Rx IC 327 includes a matching circuit 321a connected to the reception coil 321L, a rectification circuit 321b for rectifying received AC power to DC power, and an adjustment circuit 321c (e.g., LDO) for adjusting a charging voltage.

The processor 322 may perform overall control of the Rx device 301, generate various messages required for wireless power reception, and transmit the wireless power to the communication circuit 323.

The communication circuit 323 includes a first communication circuit 323a and a second communication circuit 323b. The first communication circuit 323a may communicate with the Tx device 302 through the reception coil 321L.

The first communication circuit 323a may communicate with the first communication circuit 313a through the reception coil 321L. Data (or a communication signal) generated by the first communication circuit 323a may be transmitted through the reception coil 321L. The first communication circuit 323a may transmit data to the Tx device 302 through an amplitude-shift keying (ASK) modulation scheme.

The second communication circuit 323b may communicate with the Tx device 302 through one of various short-range communication schemes such as Bluetooth, BLE, Wi-Fi, and NFC.

Packets, information, or data transmitted and received by the Tx device 302 and the Rx device 301 may use at least one of the first communication circuit 323a or the second communication circuit 323b.

The at least one sensor 324 may include a current/voltage sensor, a temperature sensor, an illumination sensor, and/or an acceleration sensor.

The display 325 may display various pieces of display information for wireless power transmission and reception.

The sensing circuit 326 may detect the Tx device 302 by detecting a search signal or power received from the Tx device 302. The sensing circuit 326 may detect a change in a signal at the coil 321L or an input/output end of the matching circuit 321a or the rectification circuit 321b by a signal of the coil 321L generated by a signal output from the Tx device 302. Alternatively, the sensing circuit 326 may be included in the reception circuit 321.

According to an embodiment, an electronic device may include a battery, a coil, a wireless charging reception circuit electrically connected to the coil, a power management module configured to control the charging state of the battery using a voltage supplied from the wireless charging reception circuit, and a processor operatively connected to the wireless charging reception circuit and the power management module, wherein the processor may be configured to receive power from a wireless charging transmission device through the coil, determine whether a predetermined condition is satisfied while the battery is charged using the received power, and transmit a foreign material detection request packet to the wireless charging transmission device 302 when the predetermined condition is satisfied.

The processor may adjust the load of supply power supplied to the power management module from the wireless charging circuit before the foreign material detection request packet is transmitted. The processor may lower the current of the supply power supplied to the power management module from the wireless charging circuit before the foreign material detection request packet is transmitted. The processor may maintain the charging state of the battery even though the wireless charging transmission device stops transmitting the power in response to the foreign material detection request packet. The processor may transmit the foreign material detection request packet at a predetermined period. The processor may shorten the predetermined period as the temperature of at least one component of the electronic device increases. The processor may transmit the foreign material detection request packet when the temperature of at least one component of the electronic device increases above a threshold value. The processor may transmit the foreign material detection request packet in response to a request from the wireless charging transmission device.

According to an embodiment, a wireless charging transmission device may include a transmission coil, a wireless charging transmission circuit electrically connected to the transmission coil, and a controller operatively connected to the wireless charging transmission circuit. The controller may be configured to set charging, based on an exchange of at least one predetermined packet with the wireless charging reception device when the wireless charging reception device is detected, transmit power to the wireless charging reception device, based on the set charging, temporarily stop transmitting the power upon receiving a foreign material detection request packet from the wireless charging reception device while the power is being transmitted, detect whether foreign material is present based on a resonance characteristic of the transmission coil while transmission of the power is stopped, stop transmitting the power when foreign material is present, and reinitiate the transmission of the power when no foreign material is present.

The controller may measure a first Q value as an electrical characteristic of the transmission coil by generation of a first Q ping before the wireless charging reception device is detected, measure a second Q value as an electrical characteristic of the transmission coil by generation of a second Q ping before the power is transmitted, measure a third Q value as an electrical characteristic of the transmission coil while transmission of the power is stopped, and determine that foreign material is present when the third Q value satisfies a predetermined condition.

The controller may determine that foreign material is present when the third Q value is below a threshold value, when the third Q value is less than or equal to a predetermined ratio of the second Q value, or when the third Q value is less than or equal to a predetermined ratio of the first Q value.

The controller may stop transmitting the power when a predetermined delay period passes after a foreign material detection request packet is received. The controller may receive a control error packet (CEP) from the wireless charging reception device after a foreign material detection request packet is received, and stop transmitting the power when a predetermined delay period passes after the CEP is received.

According to an embodiment, a method of performing wireless charging by the electronic device may include receiving power from a wireless charging transmission device through a coil and a wireless charging reception circuit, determining whether a predetermined condition is satisfied while a battery is charged using the received power, and transmitting a foreign material detection request packet to the wireless charging transmission device when the predetermined condition is satisfied.

The method may further include adjusting the load of supply power supplied to a power management module from the wireless charging reception circuit before the foreign material detection request packet is transmitted. The method may further include maintaining a charging state of the battery even though the wireless charging transmission device stops transmitting the power in response to the foreign material detection request packet. The method may further include transmitting the foreign material detection request packet at a predetermined period. The method may further include transmitting the foreign material detection request packet when the temperature of at least one component of the electronic device increases above a threshold value.

Figure 5A:
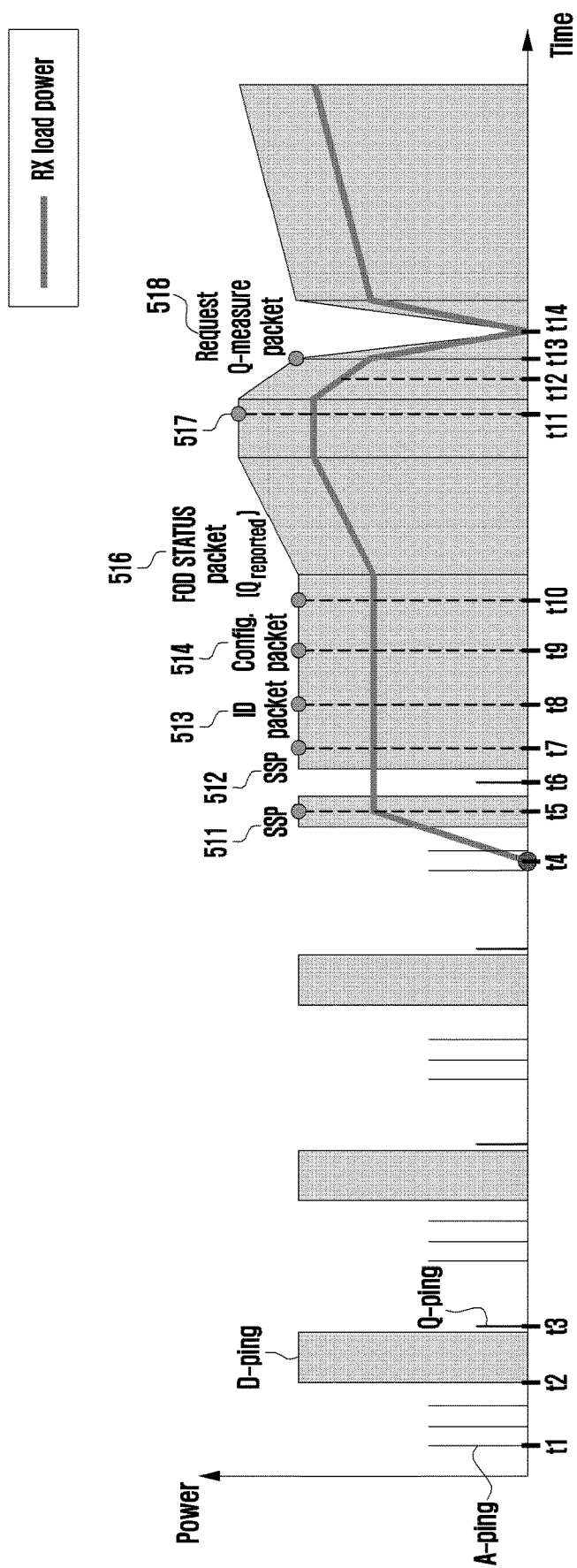
FIG. 5A is a graph illustrating operation of a wireless charging system according to an embodiment.
Figure 5B:
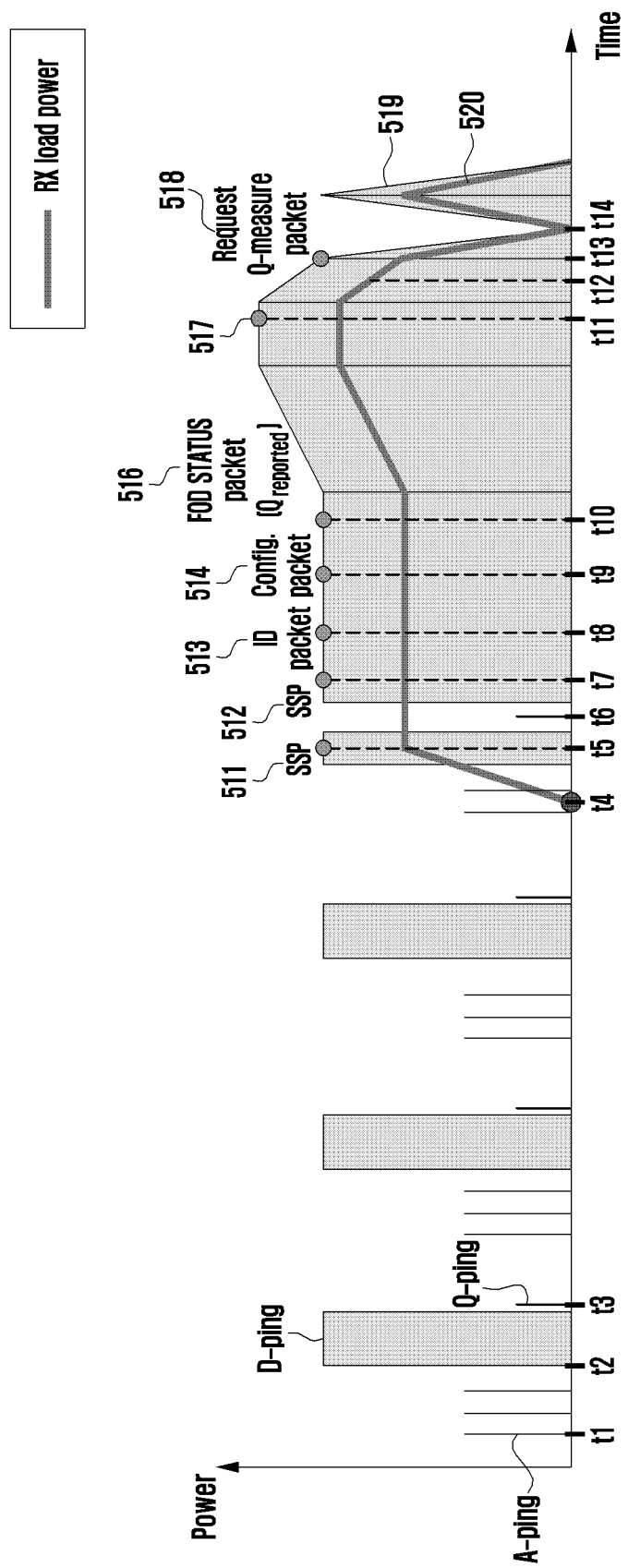
FIG. 5B is a graph illustrating operation of a wireless charging system according to an embodiment.

FIG. 5A illustrates operation of a wireless charging system according to an embodiment, and FIG. 5B illustrates operation of a wireless charging system according to an embodiment. For example, FIG. 5A illustrates operation when no foreign material is detected during wireless charging, and FIG. 5B illustrates operation when foreign material is detected during wireless charging.

Referring to FIGS. 5A and 5B, a Tx device generates an analog ping (A-ping) (e.g., a first ping) at a time t1 and detects whether a specific object (e.g., an Rx device or metallic material) is located on the interface surface (e.g., an active area). The Tx device may generate the analog ping at a predetermined period, e.g., 400 ms.

When a specific object is detected on the interface surface by the analog ping at a time t2, the Tx device generates a digital ping (D-ping) (e.g., a second ping). The digital ping may be generated for tens of microseconds. The digital ping may activate a wireless charging circuit of the Rx device. Upon receiving a signal strength packet (SSP) from the Rx device, the Tx device may determine that the specific object detected on the interface surface is the Rx device. In FIGS. 5A and 5B, the specific object detected at the time t2 is not the Rx device.

At time t3, the Tx device generates a Q ping (e.g., a third ping). The Q ping may be for measuring the Q value of a transmission coil by the Tx device. The Q value may be data based on a current (or voltage) measured in a transmission coil or a change in the current (or voltage) after the Q ping is generated. The Q value measured by the Tx device before the Rx device is detected (e.g., during standby state) may be defined as $Q_{standby}$. In FIGS. 5A and 5B, the Rx device is placed on the Tx device 302 at a time t4.

At a time t5, the Rx device transmits an SSP 511 in response to the digital ping generated by the Tx device. The Tx device determines that the specific object detected on the interface surface is the Rx device based on the received SSP 511.

When the Rx device is detected, the Tx device may stop generating additional analog pings.

At a time t6, the Tx device generates the Q ping and measure the Q value of the transmission coil. A Q value measured by the Tx device before power is transmitted to the Rx device may be defined as $Q_{bpt}$.

The Tx device may configure wireless charging while transmitting and receiving predetermined packets to and from the Rx device at time points t7 to t10. For example, the predetermined packets include an SSP 512, an identification packet 513, a configuration packet 514, and an FOD status packet 516.

When the configuration of wireless charging is completed, the Tx device may transmit power to the transmission coil. The Rx device may charge a battery with the received power.

The Rx device determines to detect foreign material while wirelessly receiving power at a time t11. For example, the Rx device determines to transmit a foreign material detection packet 518 while the battery is being charged with the received power, as indicated by reference numeral 517. The FOD request packet 518 may be referred to as a request Q-measure packet (RQP) 518. For the RQP 518, a proprietary packet or an auxiliary data control packet that can be used according to a wireless power consortium (WPC) standard may be defined and used for the purpose of the corresponding function.

The Rx device may determine to transmit the RQP 518 based on a predetermined condition (or a predetermined event), as indicated by reference numeral 517. For example, the Rx device may transmit the RQP 518 1) at a predetermined period, 2) when an abnormal state is detected, 3) in response to a request received from the Tx device, or 4) in response to a combination of at least two of conditions 1 to 3.

The Rx device may transmit the RQP 518 at a predetermined period.

The Rx device may transmit the RQP 518 at a faster period during fast wireless charging. For example, the Rx device may transmit the RQP 518 at a first period while the battery is being charged by reception of first power from the Tx device 302, and may transmit the RQP 518 at a second period, which is shorter than the first period, while the battery is being charged by reception of second power that is higher than the first power from the Tx device.

The Rx device may configure a transmission period of the RQP 518 to be shorter as the temperature of at least one component of the Rx device increases.

The Rx device may configure the transmission period of the RQP 518 to be gradually longer when it is not problematic to completely stop power transmission from the Tx device, even if the RQP 518 is transmitted several times (e.g., a predetermined number of times).

The Rx device may charge the battery in a constant current-constant voltage (CC-CV) manner and configure the transmission period of the RQP 518 to be short in a CC interval. For example, the Rx device may transmit the RQP 518 in the CC interval at a third period, and transmit the RQP 518 in a CV interval at a fourth period, which is longer than the third period.

The Rx device may transmit the RQP 518 when an abnormal state is detected, e.g., when a temperature increases above a threshold value in at least one component of the Rx device.

The Rx device may transmit the RQP 518 in response to a request received from the Tx device.

The Rx device may adjust the load of supply power (or output power) supplied to a PMIC from an Rx IC at the time point t12 before the RQP 518 is transmitted. For example, an AP of the Rx device may reduce the current of supply power supplied to the PMIC before the RQP 518 is transmitted. The Rx device may prevent charging from being stopped even though the Tx device receiving the RQP 518 stops power transmission by adjusting the load of the supply power supplied to the PMIC before the RQP 518 is transmitted. Preventing the battery charging from being stopped by the Rx device due to the adjustment of the load of the supply power will be described below in detail with reference to FIG. 8.

The Rx device transmits the RQP 518 to the Rx device at a time t13, and the Tx device may temporarily stop power transmission (e.g., for shorter than about 200 μs) in response to the RQP 518.

The Tx device may detect foreign material while power transmission is stopped at a time t14. The Tx device may measure a Q value of a transmission coil based on a characteristic of freewheeling of a voltage and a current of the transmission coil while power transmission is stopped. At this time, the measured Q value may be defined as $Q_{dpt}$.

The Tx device may determine whether foreign material is present based on the measured $Q_{dpt}$.

The Tx device may reinitiate power transmission or stop power transmission based on a result of the foreign material detection operation.

The Tx device may reinitiate power transmission while determining whether foreign material is present, and may maintain or stop power transmission based on the result of the determination about the presence of foreign material.

As illustrated in FIG. 5A, the Tx device reinitiates power transmission when no foreign material is detected, and the Rx device may continue charging the battery by re-initiation of power transmission from the Tx device.

However, referring to reference numeral 519 of FIG. 5B, the Tx device stops power transmission when foreign material is detected. Further, as illustrated by reference numeral 520 of FIG. 5B, low power (Rx load power) supplied to the PMIC from the Rx device is reduced to below a threshold value (Vth) by stoppage 519 of the power transmission from the Tx device, and the Rx device may stop battery charging.

Figure 6:
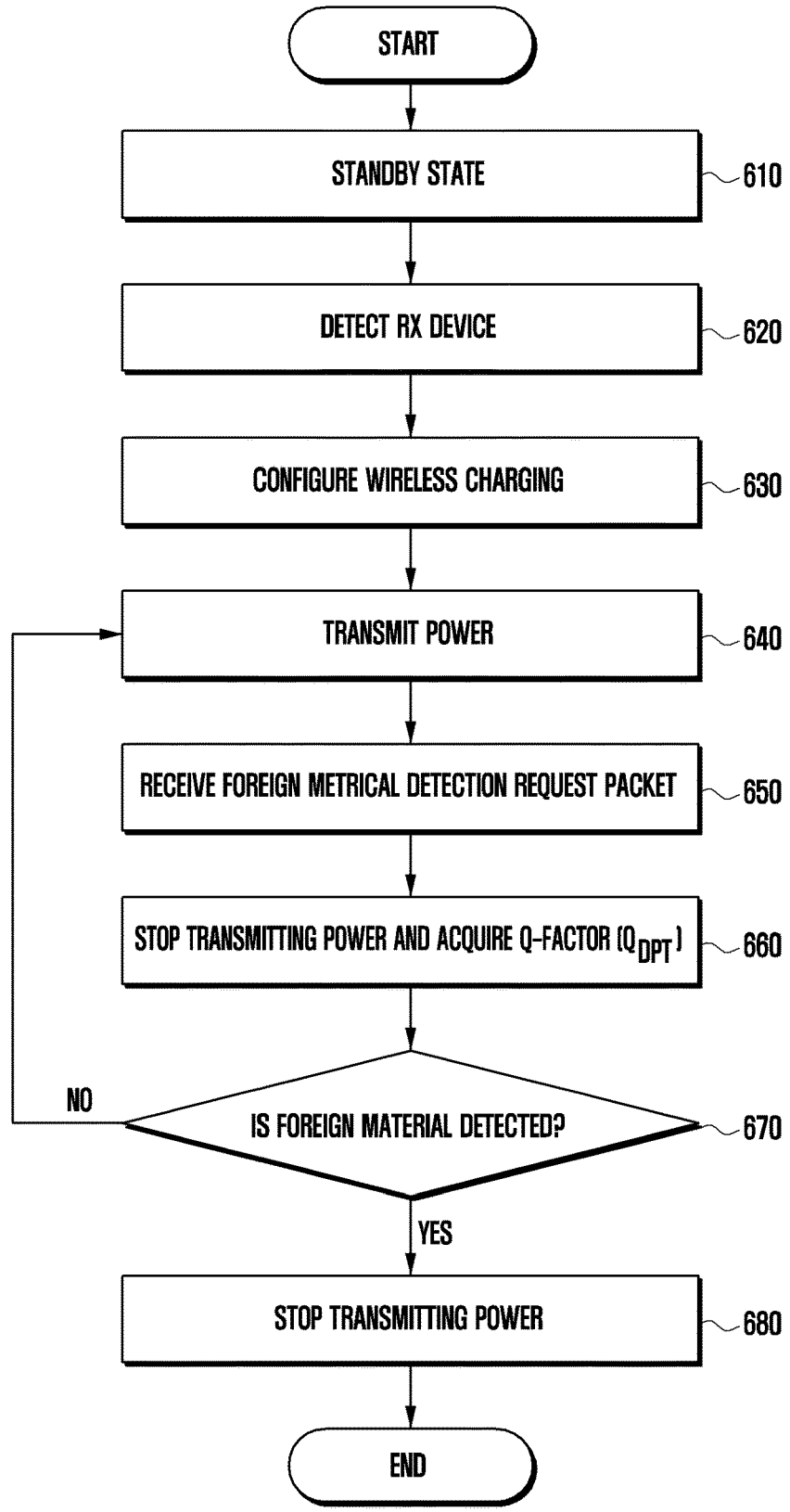
FIG. 6 is a flowchart illustrating operation of a Tx device according to an embodiment.

FIG. 6 is a flowchart illustrating operation of a Tx device according to an embodiment.

Referring to FIG. 6, in step 610, the Tx device is in a standby state in which an Rx device is not placed on the Tx device. The Tx device may periodically generate an analog ping in the standby state. When a specific object (e.g., the Rx device or a metallic material) is detected on the interface surface through the analog ping, the Tx device may generate a digital ping and a Q ping. The Tx device may measure $Q_{standby}$ as a Q value of the transmission coil through the Q ping. Alternatively, the Tx device may omit generation of the Q ping and measure $Q_{standby}$ through the digital ping.

In step 620, the Tx device detects an Rx device based on reception of the SSP from the Rx device. The Tx device may determine that the specific object detected on the interface surface is the Rx device based on reception of the SSP.

The Tx device may generate the Q ping before power is transmitted to the Rx device, and may measure $Q_{bpt}$ as the Q value of the transmission coil.

In step 630, the Tx device configures wireless charging while transmitting and receiving predetermined packets to and from the Rx device. For example, the predetermined packets include an SSP, an identification packet, a configuration packet, and/or an FOD status packet. The FOD status packet may include $Q_{reported}$ as a Q value of the reception coil. Accordingly, the Tx device may acquire $Q_{reported}$, which is the Q value of the reception coil, based on the SSP. The Tx device may determine whether there is metallic foreign material based on $Q_{bpt}$, which is the Q value of the transmission coil, and $Q_{reported}$, which is the Q value of the reception coil.

In step 640, when the configuration of wireless charging is completed, the Tx device transmits power through the transmission coil.

In step 650, the Tx device receives an RQP from the Rx device while power is transmitted through the transmission coil. The RQP may be a packet transmitted by the Rx device based on a predetermined condition, e.g., as described above with reference to FIGS. 5A and 5B.

In step 660, the Tx device stops power transmission and acquires a Q-factor in response to reception of the RQP. The Tx device may temporarily stop power transmission in response to the RQP.

For example, to synchronize the charging stop operation between the Rx device and the Tx device, the Tx device may receive the RQP and stop power transmission after a predetermined delay (for example, after 3 ms) passes from reception of the RQP, or the Tx device may receive a CEP from the Rx device after reception of the RQP, and may stop power transmission after a predetermined delay (e.g., after 3 ms) passes from reception of the CEP.

The Tx device may acquire $Q_{dpt}$ as the Q value of the transmission coil based on a characteristic of freewheeling of a voltage and a current of the transmission coil while power transmission is stopped.

In step 670, the Tx device determines whether foreign material is detected based on the $Q_{dpt}$.

For example, the Tx device 302 determines that there is metallic foreign material, when the measured $Q_{dpt}$ value is less than or equal to a threshold (e.g., $Q_{dpt}<15$), when the measured $Q_{reported}$ value is less than or equal to a predetermined ratio of the $Q_{bpt}$ value (e.g., $Q_{dpt}<Q_{bpt}*30\%$), and/or when the measured $Q_{dpt}$ value is less than or equal to a predetermined ratio of $Q_{standby}$ acquired in the standby state (e.g., $Q_{dpt}<Q_{standby}*10\%$).

The Tx device may also determine whether foreign material is present through other methods as well as the above examples. For example, the Tx device may compare the measured $Q_{dpt}$ value with $Q_{reported}$, which is the Q value of the reception coil, and determine whether foreign material is present based on the comparison result.

The Tx device may reinitiate power transmission while detection of foreign material is being performed, and may maintain or stop re-initiation of power transmission based on the result of the determination about the presence of foreign material.

In step 680, when foreign material is detected in step 670, the Tx device stops power transmission.

However, when no foreign material is detected in step 670, the Tx device reinitiates power transmission in step 640.

Figure 7:
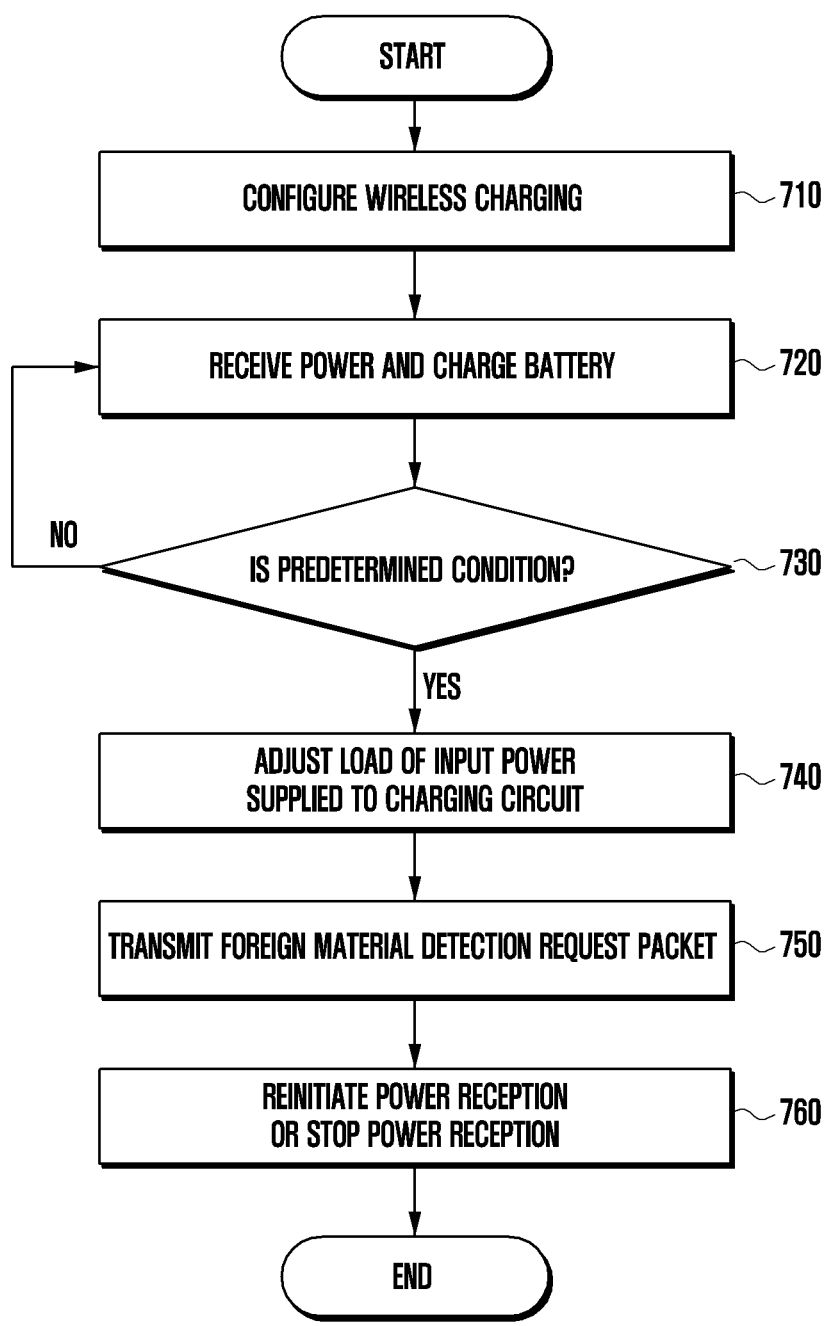
FIG. 7 is a flowchart illustrating operation of an Rx device according to an embodiment.

FIG. 7 is a flowchart illustrating operation of an Rx according to an embodiment.

Referring to FIG. 7, in step 710, the Rx device configure wireless charging after the Rx device is placed on the Tx device. The Rx device may configure wireless charging while transmitting and receiving predetermined packets to and from the Tx device. For example, the predetermined packets may include an SSP, an identification packet, a configuration packet, and/or an FOD status packet.

In step 720, the Rx device receives power from the Tx device and charges the battery based on the received power.

In step 730, the Rx device determines whether a predetermined condition (or a predetermined event) is satisfied while the battery is being charged based on the received power. The predetermined condition may be a trigger condition for transmitting an RQP to the Tx device, e.g., as described above with reference to FIGS. 5A and 5B.

When the predetermined condition is satisfied in step 730, the Rx device adjusts the load of input power (or supply power) supplied to a charging circuit in step 740. For example, an AP of the Rx device may reduce the current of supply power supplied to the PMIC before the RQP is transmitted. The Rx device may prevent charging of the battery from being stopped, even though the Tx device receiving the RQP stops power transmission, by adjusting the load of supply power supplied to the PMIC before the RQP is transmitted.

When the predetermined condition is not satisfied in step 730, the Rx device charges the battery in step 720.

In step 750, the Rx device transmits the RQP to the Tx device.

In step 760, the Tx device retransmits or stops transmission of power based on whether foreign material is detected, and accordingly, the Rx device may reinitiate power reception or stop power reception.

Figure 8:
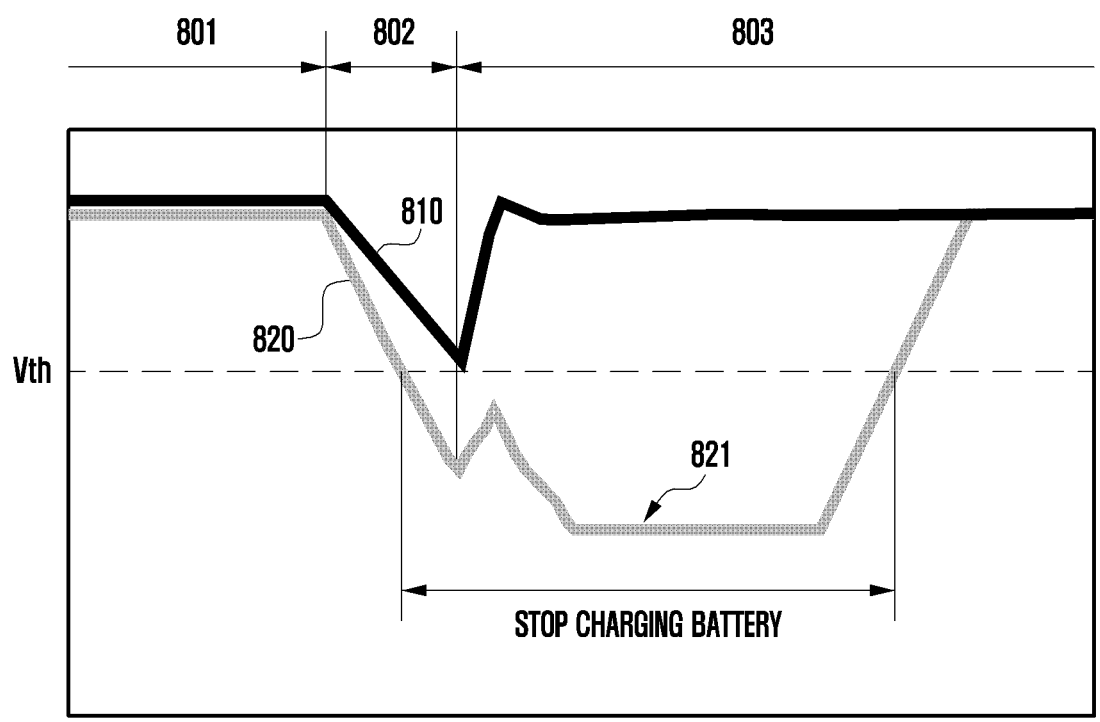
FIG. 8 is a graph illustrating a voltage supplied to a power management integrated circuit (PMIC) of an Rx device during wireless charging according to an embodiment.

FIG. 8 is a graph illustrating voltage supplied to a PMIC of an Rx device while wireless charging is performed according to an embodiment.

Referring to FIG. 8, period 801 is an interval corresponding to times t10 to t13 of FIGS. 5A and 5B, period 802 is an interval corresponding to times t13 to t14 of FIGS. 5A and 5B, and period 803 is an interval corresponding to after the time t14 of FIGS. 5A and 5B.

The graph 810 represents supply voltage (e.g., the voltage supplied to the PMIC) in which the load of supply power supplied to the PMIC is adjusted to 500 mA by the Rx device based on satisfaction of predetermined conditions.

The graph 820 represents supply voltage according to a comparative example, in which the load of supply power is maintained in the state of 1 A without any adjustment.

Referring to the period 802 in the graph 810, the voltage supplied to the PMIC from the Rx device has a voltage drop due to temporary stoppage of transmission of a power signal by the Tx device. However, the voltage supplied to the PMIC is not smaller than a threshold value Vth because the load of supply power supplied to the PMIC has already been reduced before the Rx device transmits an RQP. The Rx device may maintain the charging state of the battery while the Tx device determines whether foreign material is present by preventing the voltage supplied to the PMIC from dropping lower than the threshold value Vth. The threshold value Vth (e.g., under voltage lockout (UVLO) of the PMIC) is a reference value for determining whether to stop charging the battery by the Rx device. If the voltage supplied to the PMIC decreases below the threshold value Vth, the Rx device may stop charging the battery.

Referring to the period 802 of the graph 820, the voltage supplied to the PMIC from the Rx device according to the comparative example may drop due to temporary stoppage of transmission of a power signal by the Tx device. However, the voltage supplied to the PMIC according to the comparative example drops rapidly, and thus may not become lower than the threshold value Vth because the load of the supply power supplied to the PMIC is not lowered before the Rx device transmits the RQP.

The Rx device according to the comparative example may stop charging the battery when the voltage supplied to the PMIC decreases below the threshold value Vth.

Referring to reference numeral 821 of the graph 820, even though the Tx device 302 determines that no foreign material is present and reinitiates power transmission, the Rx device may not immediately start charging the battery. For example, the RX device may charge the battery all over again after performing the process of configuring wireless charging from the analog ping step. Accordingly, while the comparative example according to the graph 820 has a problem in that charging of the battery in the Rx device is stopped while foreign material is being detected, the embodiment according to the graph 810 may not stop charging the battery in the Rx device.

Accordingly, it is possible to prevent battery charging from being stopped as indicated by reference numeral 821 of the graph 820 by adjusting in advance the load of supply power supplied to the PMIC before the Rx device transmits the RQP.

Figure 9:
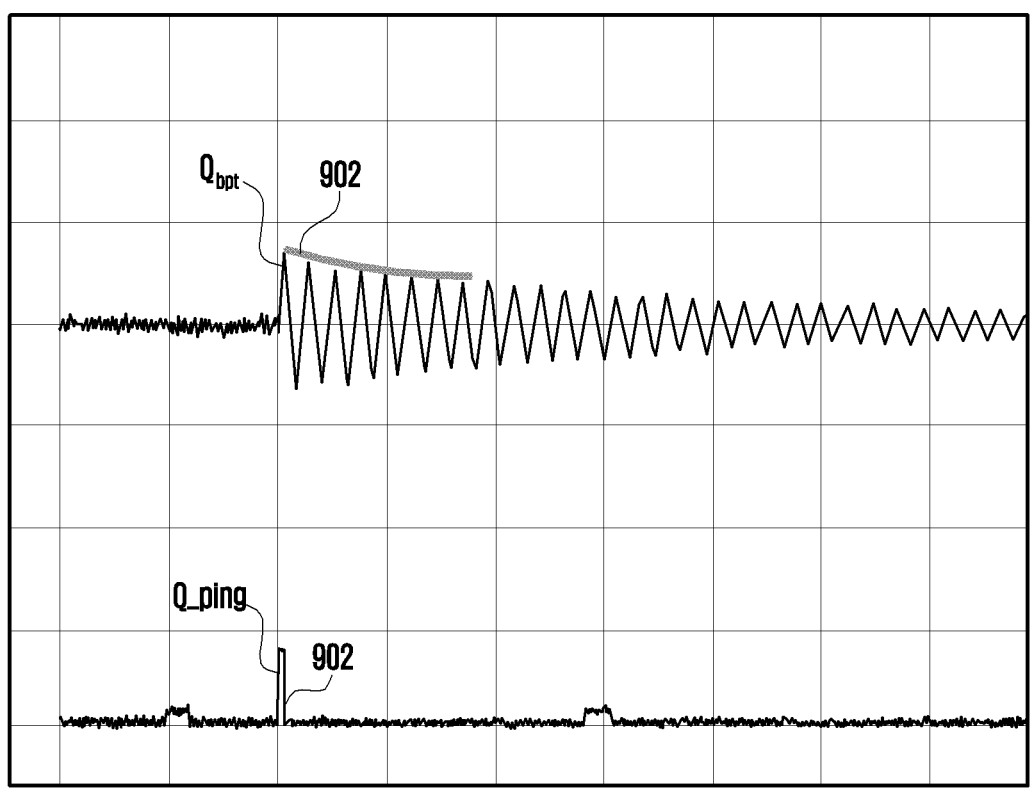
FIG. 9 is a graph illustrating a Q value of a transmission coil acquired before a Tx device transmits power according to an embodiment.
Figure 10:
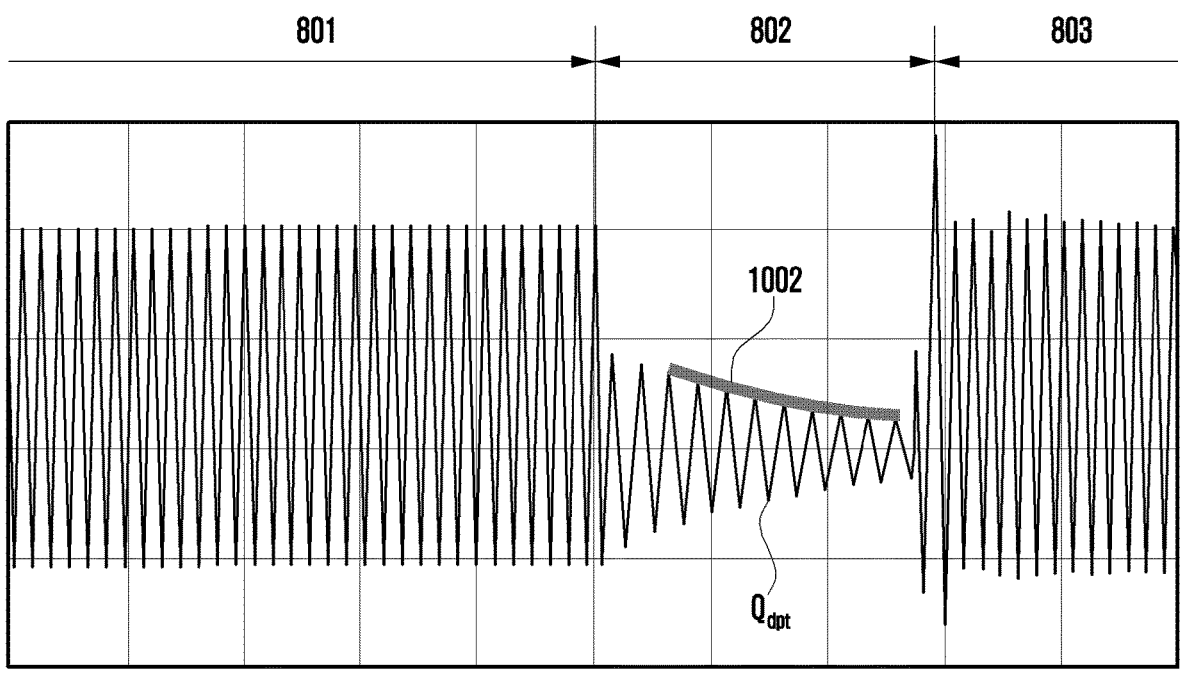
FIG. 10 is a graph illustrating a Q value of a transmission coil while a Tx device transmits power, while no foreign material is present, according to an embodiment.
Figure 11:
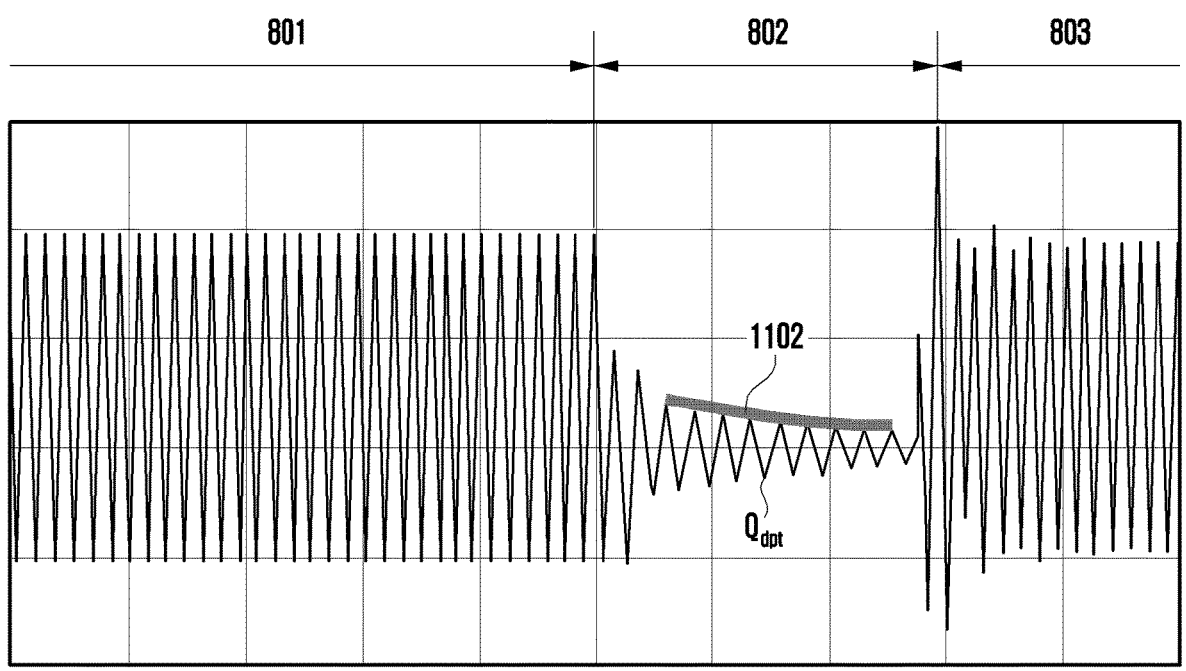
FIG. 11 is a graph illustrating a Q value of a transmission coil while a Tx device transmits power, while foreign material is present, according to an embodiment.

FIG. 9 is a graph illustrating a Q value of a transmission coil acquired before a Tx device transmits power according to an embodiment. FIG. 10 is a graph illustrating a Q value of a transmission coil acquired while a Tx device transmits power, when no foreign material is present, according to an embodiment. FIG. 11 is a graph illustrating a Q value of a transmission coil acquired while a Tx device transmits power, when foreign material is present, according to an embodiment.

In FIGS. 10 to 11, period 801 corresponds to times t10 to t13 of FIGS. 5A and 5B, period 802 corresponds to times t13 to t14 of FIGS. 5A and 5B, and period 803 occurs after the time t14 of FIGS. 5A and 5B.

Referring to FIG. 9, a Tx device may generate a Q ping before power transmission and measure $Q_{bpt}$ corresponding to a change in the voltage or the current of the transmission coil. $Q_{bpt}$ may define that peak values of a load waveform that freewheels in a transmission coil have a change in a first slope 902.

Referring to FIG. 10, the Tx device may temporarily stop transmitting power after receiving the RQP from the Rx device, and may measure $Q_{dpt}$ as the Q value of a transmission coil based on a characteristic of freewheeling of the voltage and the current of the transmission coil by resonance. For example, $Q_{dpt}$ may be defined as having a change in a second slope 1002.

When there is no foreign material between the Tx device and the Rx device, the change in the second slope 1002 may be similar to the change in the first slope 902 of FIG. 9 of $Q_{bpt}$, or may be within a predetermined error range. When the change in the second slope 1002 is similar to the change in the first slope 902 of $Q_{bpt}$ or is within the predetermined error range, the Tx device may determine that no foreign material is present between the Tx device and the Rx device.

Referring to FIG. 11, when foreign material is present between the Tx device and the Rx device, $Q_{dpt}$ has a change in a third slope 1102, and the change in the third slope 1102 may differ from the change in the first slope 902 of FIG. 9 of $Q_{bpt}$ by an amount greater than the error range. $Q_{dpt}$ may have a change in the third slope 1102, and when the difference between the change in the third slope 1102 and the change in the first slope 902 of FIG. 9 of $Q_{bpt}$ is greater than the error range, the Tx device may determine that there is foreign material between the Tx device and the Rx device.

While the disclosure has been shown and described above with reference to certain embodiments thereof, it will be understood by those skilled in the art that various changes in form and details may be made therein without departing from the spirit and scope of the disclosure as defined by the appended claims and their equivalents.

What is claimed is:

1. An electronic device, comprising:
    a battery;
    a coil;
    a wireless charging reception circuit;
    a power management module configured to control a charging state of the battery using a voltage supplied from the wireless charging reception circuit; and
    a processor configured to:
        receive power from a wireless charging transmission device through the coil,
        determine whether a predetermined condition is satisfied while the battery is charging using the received power, and
        in response to determining that the predetermined condition is satisfied, adjust a load of supply power supplied to the power management module from the wireless charging reception circuit by lowering a current of the supply power supplied to the power management module from the wireless charging reception circuit, and transmit a foreign material detection request packet to the wireless charging transmission device.

2. The electronic device of claim 1, wherein the processor is further configured to maintain a charging state of the battery even though the wireless charging transmission device stops transmitting the power in response to the foreign material detection request packet.

3. The electronic device of claim 1, wherein the processor is further configured to transmit the foreign material detection request packet at a predetermined period.

4. The electronic device of claim 3, wherein the processor is further configured to decrease the predetermined period as a temperature of at least one component of the electronic device increases.

5. The electronic device of claim 1, wherein the processor is further configured to transmit the foreign material detection request packet when a temperature of at least one component of the electronic device increases above a threshold value.

6. The electronic device of claim 1, wherein the processor is further configured to transmit the foreign material detection request packet in response to a request from the wireless charging transmission device.

7. An apparatus for performing wireless charging transmission, the apparatus comprising:
    a transmission coil;
    a wireless charging transmission circuit; and
    a controller configured to:
        configure charging, based on an exchange of at least one predetermined packet with a detected wireless charging reception device,
        transmit power to the detected wireless charging reception device, based on the configured charging,
        temporarily stop transmitting power in response to receiving a foreign material detection request packet from the wireless charging reception device while the power is being transmitted, wherein the wireless charging reception device is configured to, before transmitting the foreign material detection request packet to the apparatus, adjust a load of supply power supplied to the power management module from the wireless charging reception circuit by lowering a current of the supply power supplied to the power management module from the wireless charging reception circuit,
        detect whether foreign material is present based on a resonance characteristic of the transmission coil while transmission of the power is temporarily stopped,
        completely stop transmitting the power in response to detecting that the foreign material is present, and
        reinitiate the transmission of the power in response to detecting that the foreign material is not present.

8. The apparatus of claim 7, wherein the controller is further configured to:
    measure a first Q value of the transmission coil by generation of a first Q ping before the wireless charging reception device is detected,
    measure a second Q value of the transmission coil by generation of a second Q ping before the power is transmitted,
    measure a third Q value of the transmission coil while transmission of the power is temporarily stopped, and
    determine that the foreign material is present when the third Q value satisfies a predetermined condition.

9. The apparatus of claim 8, wherein the controller is further configured to determine that the foreign material is present when the third Q value is smaller than a threshold value.

10. The apparatus of claim 8, wherein the controller is further configured to determine that the foreign material is present when the third Q value is less than or equal to a predetermined ratio of the second Q value.

11. The apparatus of claim 8, wherein the controller is further configured to determine that the foreign material is present when the third Q value is less than or equal to a predetermined ratio of the first Q value.

12. The apparatus of claim 7, wherein the controller is further configured to stop transmitting the power when a predetermined delay period passes after receiving a foreign material detection request packet.

13. The apparatus of claim 7, wherein the controller is further configured to:
   receive a control error packet (CEP) from the wireless charging reception device after a foreign material detection request packet is received, and
   stop transmitting the power when a predetermined delay period passes after receiving the CEP.

14. A method of performing wireless charging by an electronic device, the method comprising:
   receiving power from a wireless charging transmission device;
   determining whether a predetermined condition is satisfied while a battery is charging using the received power; and
   in response to determining that the predetermined condition is satisfied, adjusting a load of supply power supplied to the power management module from the wireless charging reception circuit by lowering a current of the supply power supplied to the power management module from the wireless charging reception circuit, and transmitting a foreign material detection request packet to the wireless charging transmission device.

15. The method of claim 14, further comprising maintaining a charging state of the battery even though the wireless charging transmission device stops transmitting the power due to the foreign material detection request packet.

16. The method of claim 14, wherein the foreign material detection request packet is transmitted at a predetermined period.

17. The method of claim 14, wherein determining that the predetermined condition is satisfied comprises determining that a temperature of at least one component of the electronic device increases above a threshold value.

* * * * *